Aug. 17, 1948.  W. B. GRIFFITH  2,447,174
DRY PIPE VALVE
Filed Aug. 27, 1946  4 Sheets-Sheet 1

Inventor:
William B. Griffith
by
Attorneys.

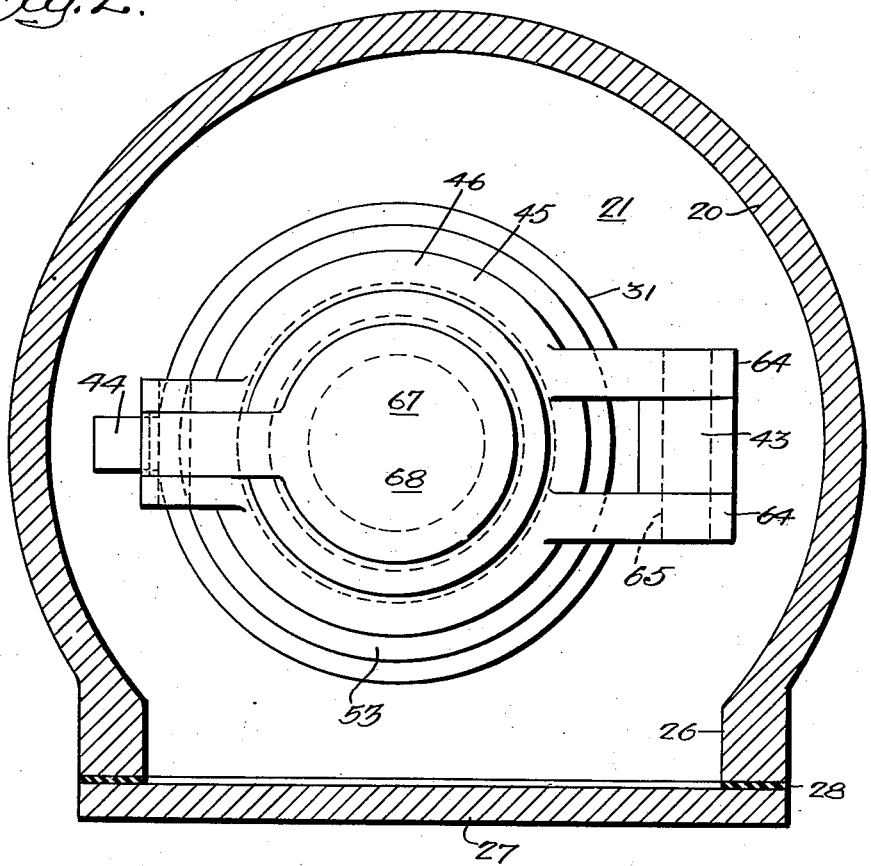

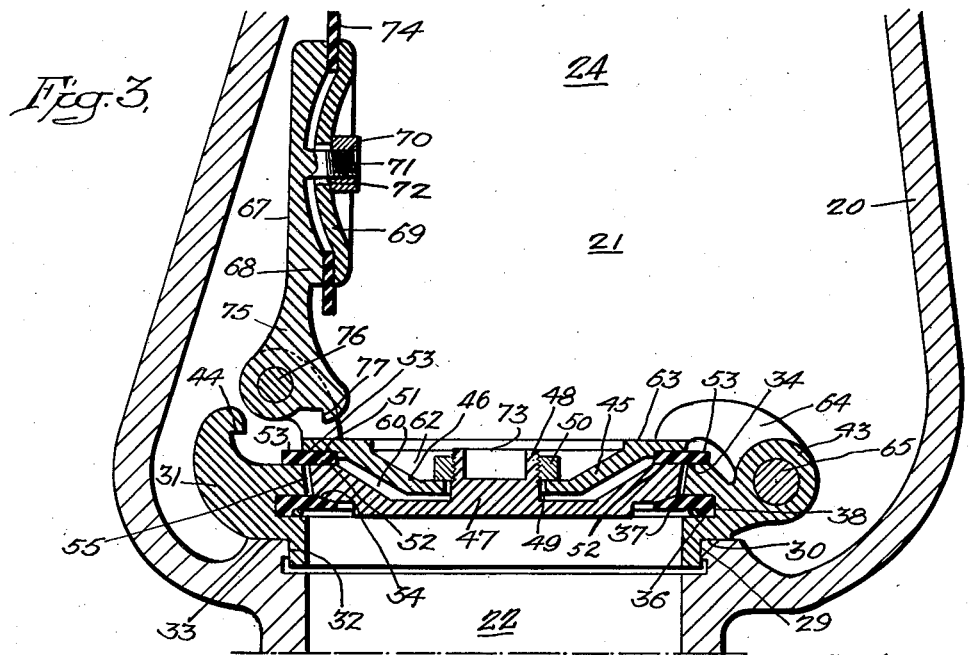

Aug. 17, 1948.                W. B. GRIFFITH                2,447,174
                                DRY PIPE VALVE
Filed Aug. 27, 1946                                      4 Sheets-Sheet 4
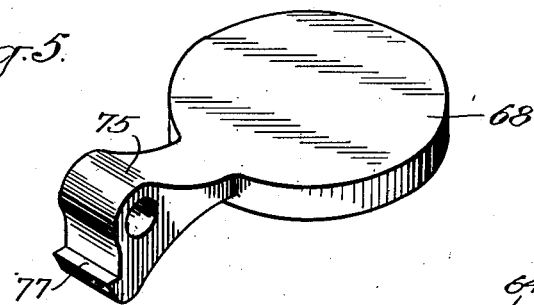
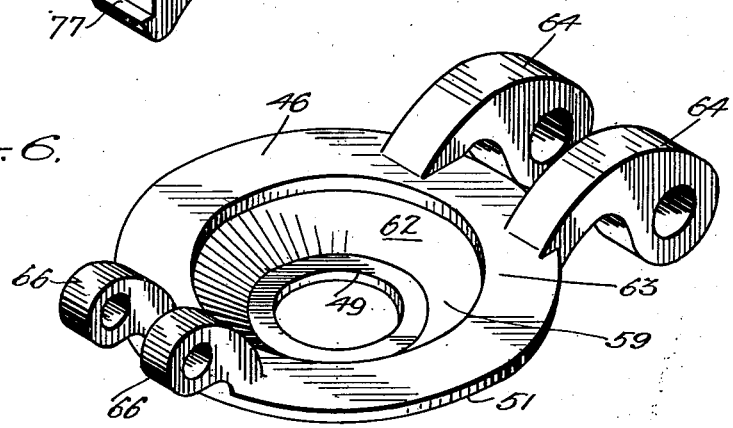
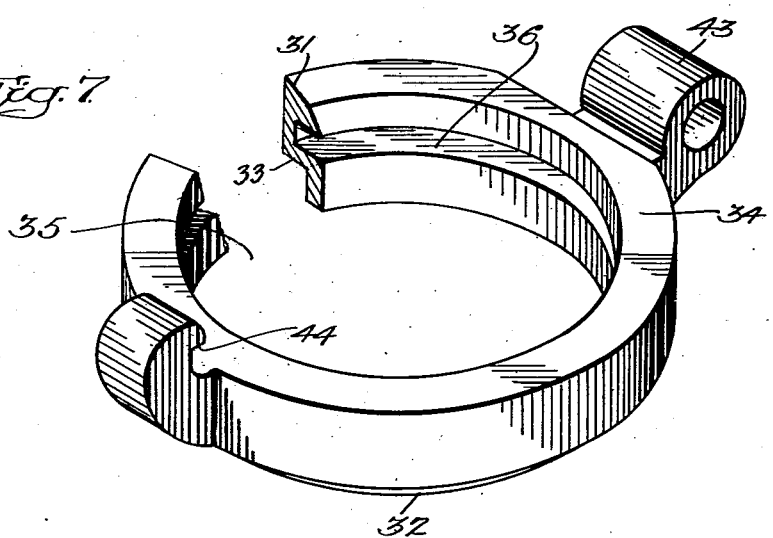

Patented Aug. 17, 1948

2,447,174

UNITED STATES PATENT OFFICE 2,447,174

DRY PIPE VALVE

William B. Griffith, Stone Harbor, N. J.

Application August 27, 1946, Serial No. 693,297

9 Claims. (Cl. 169—20)

My invention relates to valves used in fire protection systems particularly of the water sprinkler and alarm type, and commonly known in the industry as dry pipe valves.

A purpose of my invention is to simplify the construction and reduce the costs incident to machining and assembly, while at the same time reducing the size, weight and complexity of dry pipe valves for fire protection systems.

A further purpose is to improve the reliability of sealing of dry pipe valves and simplify and cheapen the construction and mounting of dry pipe valve gaskets, preferably eliminating special gasket mounting plates and small screws and avoiding trouble and expense caused by corrosion of such parts.

A further purpose is to construct the valve seat and the clappers of a dry pipe valve as a unit, all ultimately supported on the valve seat, and capable of assembly outside of the valve casing and insertion as a unit into the valve casing or subsequent replacement as a unit for maintenance purposes.

A further purpose is to pivotally mount the water valve clapper on the water valve seat, to pivotally mount the air valve clapper on the water valve clapper, and to latch the water valve clapper with respect to the water valve seat.

A further purpose is by simplifying the valve construction to permit a decrease in the over-all size and to permit insertion of the unitary preassembled valve elements through the normal access opening of the valve casing, without the necessity of assembly of the valve in place inside the casing.

Further purposes appear in the specification and in the claims.

In the drawing, I have chosen to illustrate one only of the numerous embodiments in which my invention appears, the forms shown being chosen from the standpoints of convenience in illustration, satisfactory operation and clear demonstration of the principles involved.

Figure 2 is a sectional plan of my improved dry pipe valve, the section being taken on the line 2—2 of Figure 1.

Figures 3 and 4 are fragmentary views corresponding to Figure 1, but showing the valve in different positions.

Figure 1:
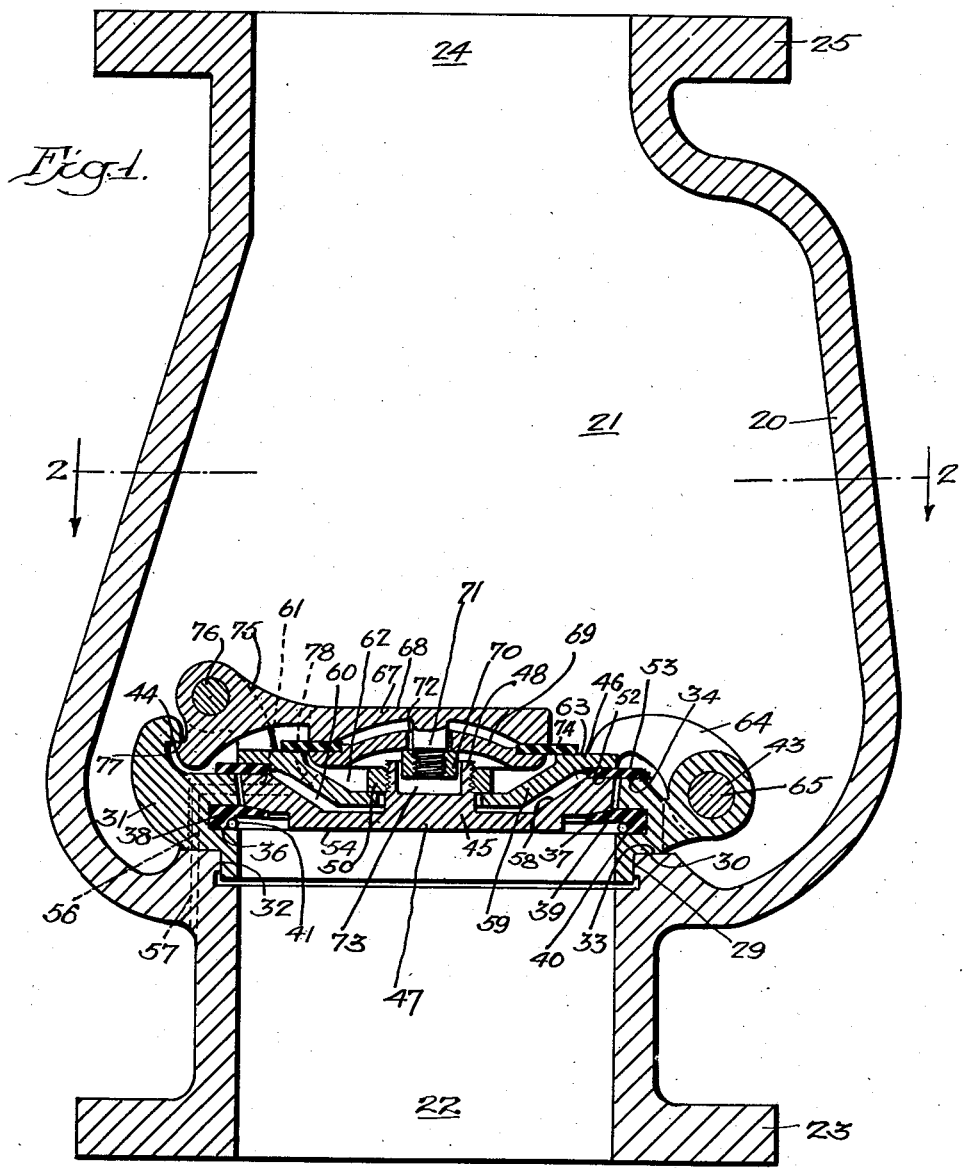
Figure 1 is a central vertical section of a dry pipe valve to which my invention has been applied.

Figures 5, 6, and 7 are detached perspectives of components of the valve elements, Figure 5 showing the main portion of the air valve clapper, Figure 6 showing the main portion of the water valve clapper and Figure 7 showing the water valve seat, partially broken away.

Describing in illustration but not in limitation but referring to the drawings:

One recognized type of fire protection system as commonly used in the prior art is the dry pipe system, in which the sprinkler heads including fusable elements, or other convenient protection units, are distributed throughout the building and connected by piping normally containing air under slight pressure, and in communication with a main control valve, called a "dry pipe" valve, which admits water to the piping and suitably also to an indicator or alarm system at a time when opening of an individual sprinkler head or similar device due to the presence of a fire reduces the air pressure to a predetermined level, and thereby causes opening of the dry pipe valve to admit water to the system.

The present invention is directed to improvements in the construction of dry pipe valves, to eliminate difficulties which have acted as limitations upon the utility of dry pipe fire protection systems.

The valve casing 20 comprises a valve operating chamber 21, a water connection 22 to the domestic water supply or other suitable water source, suitably flanged at 23, and an air connection at 24 to the sprinkler piping and to an alarm mechanism, suitably flanged at 25. It will be understood, of course, that while the connection 24 normally carries air under slight pressure, when the mechanism is operating under emergency conditions and the water valve is open, it will carry water to the points at which sprinklers or the like are opened.

Access to the valve operating chamber 21, for insertion and removal of the valve mechanism and maintenance of the same, is provided by an access opening or hand hole 26 covered by a plate 27, gasketed at 28 and attached by means not shown.

At the lower end of the valve operating chamber 21 I provide a suitably annular valve seat recess 29 extending below a valve retaining shoulder 30.

The recess 29 and shoulder 30 are desirably horizontal and axial so that they can be machined readily through the opening at 24 in the valve casing.

The entire valve seat and clappers form a unit which is mounted by positioning the water valve seat in the recess 29 and against the shoulder 30 as shown in Figures 1, 3 and 4. The water valve seat 31, seen detached in Figure 7, has at its lower edge an annular rim 32 which extends into the recess 29, suitably making a press fit in the recess 29, and a shoulder 33 on the seat abuts against the shoulder 30 on the valve casing.

An upwardly directed water valve seat face 34 is provided on the seat for engagement with a gasket later to be described. The water valve seat face 34 is suitably annular and defines a central opening 35 through the water valve joining the connections 22 and 24 of the casing when the valve is in open position as shown in Figure 4.

Intermediate between the rim of the water valve seat and the upwardly directed water valve seat face, I provide a suitably annular recess 36 extending outwardly from the interior of the valve seat and receiving a circumferential outer portion 38 of a gasket 37 suitably made of rubber, synthetic rubber, leather, or the like, and suitably downwardly sloped on its top edge to engage the water valve clapper as later explained. The circumferential outer portion 38 of this gasket is suitably enlarged to fill the recess, while the gasket is axially narrower at its circumferential inner end 39 to provide a shoulder at 40 which is engaged by a suitably resilient metallic wire retaining ring 41 extending substantially all of the way round the shoulder 40.

Mounted on the seat 31, most desirably at diametrally opposite positions, I provide a water valve pivot bearing 43 and a latching lug 44, conveniently located on the outer periphery of the seat 31. The bearing opening through the bearing 43 will desirably be horizontal and parallel to the tangent to the interior opening of the seat at the point at which the bearing is located, as shown best in Figures 2, 3 or 4.

Pivotally mounted on the bearing 43 I provide a water valve clapper 45 suitably made as an assemblage of separate parts. The main clapper element 46 is on top, in closed position, of a clapper clamping element 47, which has a central threaded extension 48 passing through a central opening 49 in the main clapper element and locked in place by a nut 50.

At the outer circumference of the water valve clapper element and on its lower face in closed position, I provide a gasket clamping face 51 which cooperates with a gasket clamping face 52 on the clamping plate 47, to engage and grip a suitably circular gasket 53 which extends radially outward and in closed position makes sealing contact with a water valve seat face 34 on the water valve seat.

Thus in closed position as seen in Figure 1, the gasket 37 makes sealing engagement with a water valve face 54 at the bottom of the clamping plate 47 on the water valve clapper, and the gasket 53 makes sealing engagement with the water valve seat face 34, while between the two gaskets a space 55 suitably of annular form is provided between the clamping plate 47 and the valve seat. In closed position of the valve this space 55 is suitably connected to the atmosphere as by a passage 56 through the valve and a passage 57 through the valve casing. Since this passage is likely to discharge water in open position of the water valve, the passage 57 may be connected to a drain.

In order to reduce the radial extent of the water valve clapper, the clamping plate 47 is recessed at 58 in suitably conical form and the water valve clapper element 46 is likewise formed into a cooperating conical shape at 59, producing an interior chamber 60 which is connected to the space 55 in closed position of the valve by a passage 61. Due to the conical formation of the water valve clapper element 46, the nut 50 and extension 48 are contained in a recess 62 in the upper face of the water valve clapper in closed position.

Around the recess 62 on the upper face of the water valve clapper I provide an air valve face 63 as best seen in Figures 3 and 6.

The water valve clapper 45 has pivot extensions 64 which are conveniently located on either side of the water valve pivot bearing 43 as shown on Figure 2, and which pivot on pivot pin 65.

Oppositely diametrally placed with respect to the pivot extensions 64, and adjoining the outer peripherial edge of the water valve clapper, I provide pivot extensions 66 for the air valve, suitably spaced on opposite sides of the latching lug 44, and positioned to make latching easy in the manner later explained.

The air valve is controlled by an air valve clapper 67 desirably comprising a main clapper element 68, a clamping plate 69 and a clamping nut 70. A stud 71 extends downwardly in closed position at the center of the main air valve clamping element 68 through an opening 72 in the clamping plate 69, and is engaged by the nut 70 on the lower side of the clamping plate, the stud and the nut 70 suitably extending into a recess 73 in the extension 48 from the clamping plate 47 of the water valve clapper.

Between the main air valve clapper element 68 and the clamping plate 69, an annular gasket 74 is suitably clamped and permitted to extend radially outward beyond the perimeter of the air valve parts to engage and seal against the air valve seat face 63 on the water valve clapper.

The air valve clapper has at one circumferential position a pivotal extension 75 which is positioned between the air valve pivot extensions 66 and pivots on an air valve pivot pin 76. On the extension 75 I also provide a latch 77 which, in closed position of the air valve, engages the latching lug 44 and in open position of the air valve frees therefrom.

In the closed position of the air valve as shown in Figure 1 it will be noted that the recess 62, formed primarily by the shape of the water valve clapper, is closed by the air valve clapper. A passage 78 extends through the main element of the water valve clapper, connecting the chamber 60 at the interior of the water valve clapper with the chamber 62. Since as already explained, the chamber 60 is connected to atmosphere in closed position of the valve through the passages terminating in the passage 57, the chamber 62 will be at atmospheric pressure in the closed position of the valve.

It is important to note that the air valve gasket can be replaced readily by simply removing the nut 70 and the clamping plate 69, without the necessity of removing small screws or sheet metal gasket plates. In similar manner the upper gasket of the water valve clapper may be replaced by removing the nut 50 and the water valve clapper clamping plate, likewise without the necessity of any manipulation of small gasket screws. The lower water valve gasket can be taken out readily by simply removing the spring gasket clamping ring.

For installation the entire assembly can be made up and tested outside of the casing and can be installed through the access opening 28 and seated simply by pressing the seat into position. No adjustment need be made for the relation between the casing and the valve, as in previous structures where operative parts of the valve were separately mounted on the casing.

If replacement of the valve is required, it is simply necessary to remove the water valve seat, and all of the operating parts can be removed with the seat. However, this will not be necessary merely for replacement of a gasket, as the gasket is readily accessible by simply opening the air valve to the position of Figure 3 for the air valve gasket and by loosening the nut on the upper water valve gasket, and by raising the entire valve to the position of Figure 4 for the replacement of the lower water valve gasket.

In operation, starting with the mechanism in closed position as shown in Figure 1, water under suitable water pressure will be below the valve in the space 22, and air under slight elevated pressure will be above the valve in the space 24 and through the system to the sprinkler heads and other protective devices. In some cases there may be and preferably will be a small quantity of water above the valve to aid in maintaining a seal, but this will preferably be only a few inches deep in any case.

The upward force of the water on the water valve clapper tends to swing the water valve clapper about its clapper pivot, but so long as the pressure on the air valve clapper is sufficiently greater than the atmospheric pressure in the chamber 62 below the air valve clapper, the latch will remain seated and the water valve will remain latched in closed position.

Obviously the relation of the air pressure at 24 and the water pressure at 22 at which the latch can unseat will depend upon the ratios of the lever arms and the areas of the respective clappers and the lever arm of the latch, but it is convenient in the preferred embodiment to operate with an air pressure at 24 of approximately ⅛ of the water pressure at 22, allowing the device to open if the air pressure drops to a substantially lower value as for example due to the opening of a sprinkler head. Any other suitable relation of normal air pressure to normal water pressure may be employed as desired.

As soon as the air pressure at 24 drops below the predetermined value for maintaining the air valve closed, the force of the water pressure acting on the latch will force the air valve open far enough to unlatch at 44 and into a position as suggested by Figure 3 (although actually due to the timing of the action it may be that in an individual case the air valve clapper may not reach the full open position as shown in Figure 3 before the water valve clapper opens as later explained).

As soon as the water valve clapper is free to open due to releasing of the latch by opening of the air valve clapper, the water pressure will cause the water valve clapper to open to a position as shown in Figure 4, at the same time, under the action of gravity and of the pressure of the casing, closing the air valve clapper against the water valve clapper.

The device is now in full open position as in an emergency such as fire, and it will tend to remain in this position until reset through the access opening.

It will be evident that by my device I have greatly simplified and facilitated the construction and maintenance of a dry pipe valve, and made it possible to produce a device of this kind of greater simplicity and at lower expense.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a dry pipe valve for a fire protection system, a valve body having a seat receiving recess, a water valve seat engaging in the recess having, supported thereon, a latching lug and a water valve pivot bearing, a water valve clapper making pivotal connection with the water valve pivot bearing and making sealing connection with the water valve seat and having, mounted thereon, an air valve pivot bearing and an air valve seat, an air valve clapper making pivotal connection with the air valve pivot bearing and sealing connection with the air valve seat, and having a latch in closed position making latching engagement with the latching lug, the air valve clapper forming with the water valve clapper in closed position a closed space and means for connecting the closed space to the atmosphere, whereby the water valve seat, water valve clapper and air valve clapper form a unitary structure all mounted ultimately on the water valve seat.

2. In a dry pipe valve for a fire protection system, a valve casing having a recess for a water valve seat, a water valve seat positioned in the recess and having, oppositely circumferentially disposed, a latching lug and a water valve pivot bearing, the water valve seat having a seat face adjacent its upper edge, and having a gasket recess below the seat face, a first gasket supported in and extending from the gasket recess, a water valve clapper having a valve surface engaging the first gasket and having a second gasket engaging the water valve seat face in closed position, pivotally connected to the water valve pivot bearing and having, oppositely diametrally located thereon, an air valve clapper pivot bearing, an air valve clapper pivotally connected to the air valve clapper pivot bearing, having a latch in closed position engaging the latching lug and a third gasket mounted on the air valve clapper and making sealing connection in closed position with a seat face of the water valve clapper, forming an air chamber between the air valve clapper and the water valve clapper, and means for connecting the air chamber to the atmosphere, the air valve clapper and water valve clapper being ultimately supported as a unit on the water valve seat.

3. In a dry pipe valve for a fire protection system, a valve casing, a water valve seat substantially horizontally mounted in the casing and having a water valve seat face, a latching lug and a water valve clapper pivot bearing oppositely diametrally placed on the water valve seat, a water valve clapper having an air valve seat portion which water valve clapper is provided with an air valve pivot bearing, which water valve clapper is pivotally connected to the water valve clapper bearing and which water valve clapper has an air valve seat face on its upper surface in closed position of the water valve clapper and the water valve clapper having a clamping portion which cooperates with the air valve seat portion and lies below the air valve seat portion in closed position, a gasket engaged in sealing relation with the water valve seat face in closed position and clamped between the air valve seat portion and the clamping portion of the water valve clapper, means for clamping the portions of the water valve clapper against the gasket, an air valve clapper pivotally engaged by the air valve pivot bearing, and in closed position latching on the latching lug and sealing on the air valve seat portion.

4. In a dry pipe valve for a fire protection system, a valve casing, a water valve seat substantially horizontally mounted in the casing and having a water valve seat face, a latching lug and a water valve clapper pivot bearing oppositely diametrally placed on the water valve seat, a water valve clapper having an air valve seat portion which water valve clapper is provided with an air valve pivot bearing, which water valve clapper is pivotally connected to the water valve clapper bearing and which water valve clapper has an air valve seat face on its upper surface in closed position of the water valve clapper and the water valve clapper having a clamping portion which cooperates with the air valve seat portion and lies below the air valve seat portion in closed position, a gasket engaged in sealing relation with the water valve seat face in closed position and clamped between the air valve seat portion and the clamping portion of the water valve clapper, means for clamping the portions of the water valve clapper against the gasket, an air valve clapper making pivotal connection with the air valve pivot bearing, having a latch engaging the latching lug, a second gasket supported on the air valve clapper in sealing position with respect to the air valve seat face in closed position, there being an air chamber between the air valve clapper and the water valve clapper in closed position, and means for connecting the air chamber with atmosphere in closed position.

5. In a dry pipe valve for a fire protection system, a valve casing having a substantially horizontal valve seat recess, a water valve seat supported in the valve seat recess and having a water valve seat face at its upper surface and, at oppositely diametrally spaced positions, having a latching lug and a water valve pivot bearing, a water valve clapper pivotally connected with the water valve pivot bearing and, opposite thereto and adjoining the latch, having an air valve pivot bearing, the water valve clapper being made up of separable parts clamped together, a water valve gasket clamped between the parts of the water valve clapper and in closed position engaging the water valve seat face, an air valve clapper pivotally connected to the air valve pivot bearing, having a latch engaging the latching lug in closed position and made up of separable parts clamped together, an air valve gasket engaging the air valve seat face on the water valve clapper in closed position and clamped between the separable parts of the air valve clapper, there being an atmosphere chamber between the air valve chamber and the water valve clapper in closed position, and means for connecting the atmosphere chamber to the atmosphere in closed position.

6. In a dry pipe valve for a fire protection system, a valve casing having a valve seat recess, a valve seat engaged in the recess, having at its upper edge a valve seat face and having at opposite diametral positions a water valve clapper pivot bearing and a latching lug, the valve seat having an annular recess below the water valve seat face, a first gasket mounted in the recess and extending annularly inward into valve closing relation, a water valve clapper pivotally connected with the water valve clapper pivot bearing, having a valve face engaging the gasket, having an upward air valve seat face, and having an air valve pivot bearing, a second gasket mounted on the water valve clapper and in closed position engaging the water valve seat face, an air valve clapper pivotally connected on the air valve pivot bearing, and having a latch engaging the latching lug in closed position, a third gasket mounted on the air valve clapper and engaging the air valve seat face in closed position, there being an air chamber between the two clappers, and means for connecting the air chamber to atmosphere.

7. In a dry pipe valve for a fire protection system, a valve casing having a substantially horizontal valve seat recess, a water valve seat engaging in the recess having an upwardly directed water valve seat face, having an annular recess below the face and, oppositely diametrally placed, having a latching lug and a water valve clapper pivot bearing, a water valve clapper pivotally connected to the water valve clapper pivot bearing having an upwardly directed air valve seat face, a downwardly directed water valve face, and having diametrally oppositely positioned from the water valve pivot bearing an air valve pivot bearing adjacent the latching lug, a first gasket positioned in the annular recess in the water valve seat and in closed position engaging the water valve face on the water valve clapper, a second gasket mounted on the water valve clapper and in closed position engaging the upwardly directed water valve seat face, an air valve clapper pivotally connected on the air valve clapper bearing, having a latch in closed position engaging in the latching lug, and a third gasket mounted on the air valve clapper in closed position engaging the upwardly directed air valve seat face, the clappers forming between them in closed position an air chamber, and walls forming a passage from the air chamber to atmosphere extending through the space between the first and second gaskets closed respectively against the water valve clapper face and the upwardly directed water valve seat face.

8. In a dry pipe valve for a fire protection system, a valve casing having a substantially horizontal valve seat recess, a water valve seat engaged in the recess having an upwardly directed water valve seat face and below the seat face an annular interior recess, and having, oppositely diametrally positioned, a latching lug and a water valve pivot bearing, a first gasket engaged in the valve seat recess and extending annularly inwardly of the valve seat, a water valve clapper having a downwardly directed water valve face engaging the first gasket in closed position and an upwardly directed air valve seat face, pivotally connected to the water valve pivot bearing and having diametrally, oppositely positioned from the water valve pivot bearing an air valve pivot bearing, the water valve clapper having separable parts clamped together, a second gasket clamped between the separable parts of the water valve clapper and extending into sealing engagement with the upwardly directed water valve seat face, and an air valve clapper pivotally connected on the air valve pivot bearing, having a latch engaging the latching lug in closed position, having separable parts and clamped together, a third gasket clamped between the separable parts of the air valve clapper and extending outwardly into sealing engagement with the upwardly directed air valve seat face in closed position, the clappers in closed position forming between them an air chamber, and means for connecting the air chamber to atmosphere in closed position of the parts.

9. In a dry pipe valve for a fire protection system, a valve casing having a substantially horizontal valve seat recess, a water valve seat engaged in the recess having an upwardly directed water valve seat face and, below the seat face, an annular interior recess, and having, oppositely diametrally positioned, a latching lug and a water valve pivot bearing, a first gasket engaged in the valve seat recess and extending annularly inwardly of the valve seat, a water valve clapper having a downwardly directed water valve face engaging the first gasket in closed position and an upwardly directed air valve seat face, pivotally connected to the water valve pivot bearing, and having, diametrally oppositely positioned from the water valve pivot bearing, an air valve pivot bearing, the water valve clapper having separable parts clamped together, a second gasket clamped between the separable parts of the water valve clapper and extending into sealing engagement with the upwardly directed water valve seat face, an air valve clapper pivotally connected on the air valve pivot bearing, having a latch engaging the latching lug in closed position, having separable parts clamped together, a third gasket clamped between the separable parts of the air valve clapper and extending outwardly into sealing engagement with the upwardly directed air valve seat face in closed position, the clappers in closed position forming between them an air chamber and passage walls, extending through the space between the first and second gaskets, connecting the air chamber to atmosphere in closed position of the clappers.

WILLIAM B. GRIFFITH.

REFERENCES CITED

The following references are of record in the file of this patent:

UNITED STATES PATENTS

| Number | Name | Date |
|---|---|---|
| 1,575,607 | Adams | Mar. 9, 1926 |
| 2,022,586 | Clontz | Nov. 26, 1935 |